(12) United States Patent
Carlson et al.

(10) Patent No.: US 6,706,802 B2
(45) Date of Patent: Mar. 16, 2004

(54) SEALANTS

(75) Inventors: David C. Carlson, Rochester Hills, MI (US); Abraham Kassa, Shelby Township, MI (US); Thomas Guenther, Romeo, MI (US)

(73) Assignee: L & L Products, Inc., Romeo, MI (US)

( * ) Notice: Subject to any disclaimer, the term of this patent is extended or adjusted under 35 U.S.C. 154(b) by 0 days.

(21) Appl. No.: 09/944,975

(22) Filed: Aug. 31, 2001

(65) Prior Publication Data

US 2003/0045620 A1 Mar. 6, 2003

(51) Int. Cl.[7] .................................................. C08F 8/00
(52) U.S. Cl. ........................ 524/539; 523/400; 525/61
(58) Field of Search ................................ 524/394, 398, 524/425, 426, 427, 451, 445, 449, 500, 423, 539; 523/401, 442, 458, 400; 525/61

(56) References Cited

U.S. PATENT DOCUMENTS

| 5,118,531 A | * | 6/1992 | Petersen et al. | 427/230 |
| 5,135,594 A | * | 8/1992 | Johnston | 156/83 |
| 5,254,263 A | * | 10/1993 | Gerace et al. | 210/667 |
| 5,352,717 A | * | 10/1994 | Bergishagen | 524/48 |
| 5,710,199 A | * | 1/1998 | Hubert et al. | 524/141 |

* cited by examiner

Primary Examiner—David W. Wu
Assistant Examiner—Satya Sastri
(74) Attorney, Agent, or Firm—Dykema Gossett PLLC

(57) ABSTRACT

A group of sealants are described which utilize a by-product of paint booth spray operations. Processed paint booth overspray particles are combined with various resins, curing agents to form the sealant compositions.

4 Claims, 1 Drawing Sheet

SEALANTS

FIELD OF THE INVENTION

The present invention relates generally to resin-based sealing materials for use in closing gaps and holes in a variety of structural environments.

BACKGROUND OF THE INVENTION

In the automotive industry it is often necessary to seal gaps and joints in metal structures using an adhesive bead, plug or patch. For example, where a stamping and a structural beam meet a longitudinal gap may arise. In addition, drainage holes, assembly access holes, fastening holes and the like are often formed in automobile body structures and must be subsequently closed. As will be appreciated by those skilled in the art, if left unsealed these gaps and holes allow dust and fumes to enter the passenger compartment and create a source for water leakage and corrosion.

It is known that the cost of resins often exceeds that of other materials. Accordingly, significant research has been conducted to produce resin-based sealants which take advantage of low-cost starting materials.

It is also known that when manufacturing plants spray automotive bodies in paint spray booths, only 50–60% of the paint spray actually adheres to the surface being painted. Typically, that portion of the paint spray that does not adhere (the "overspray") is exhausted from the spray booth by means of a wet scrubber system. Of course, a wide variety of paint formulations are used in the industry. The resulting overspray, which may be a mixture of different paint formulations from multiple paint applications, is generally treated in solution to detackify the paint particles so they are non-sticky. Next, a process the paint particles are flocculated so they can be collected. Heat is then applied to the resulting paint solids to drive off all of the volatiles and water. Once the paint solids are dried and sized, they have the consistency of a powder; the chemistry of these solids is very similar to the paint that was applied in the paint booth.

SUMMARY OF THE INVENTION

In one aspect the present invention provides resin-based materials for use as sealants. The inventive sealant materials include as a key component processed overspray from an automotive paint booth. The processed paint booth overspray preferably comprises substantially fully-cured overspray resins in particulate form. In one aspect the paint booth overspray is principally a substantially fully-cured acrylic material. In another aspect, the paint booth overspray also includes substantially fully-cured epoxy material. As used herein, "substantially fully-cured" shall mean the resins are substantially inert; that is, the polymers do not undergo any significant further polymerization or cross linking. In one aspect, the inventive compositions also include a blowing agent to produce an expandable material.

In another aspect the present invention provides a method of sealing a gap with a resin-based sealant materials which include as a component processed overspray from an automotive paint booth.

In still another aspect of the present invention, a method of making a sealant material which contains processed overspray from an automotive paint booth.

DETAILED DESCRIPTION OF THE PREFERRED EMBODIMENTS

Figure 1:
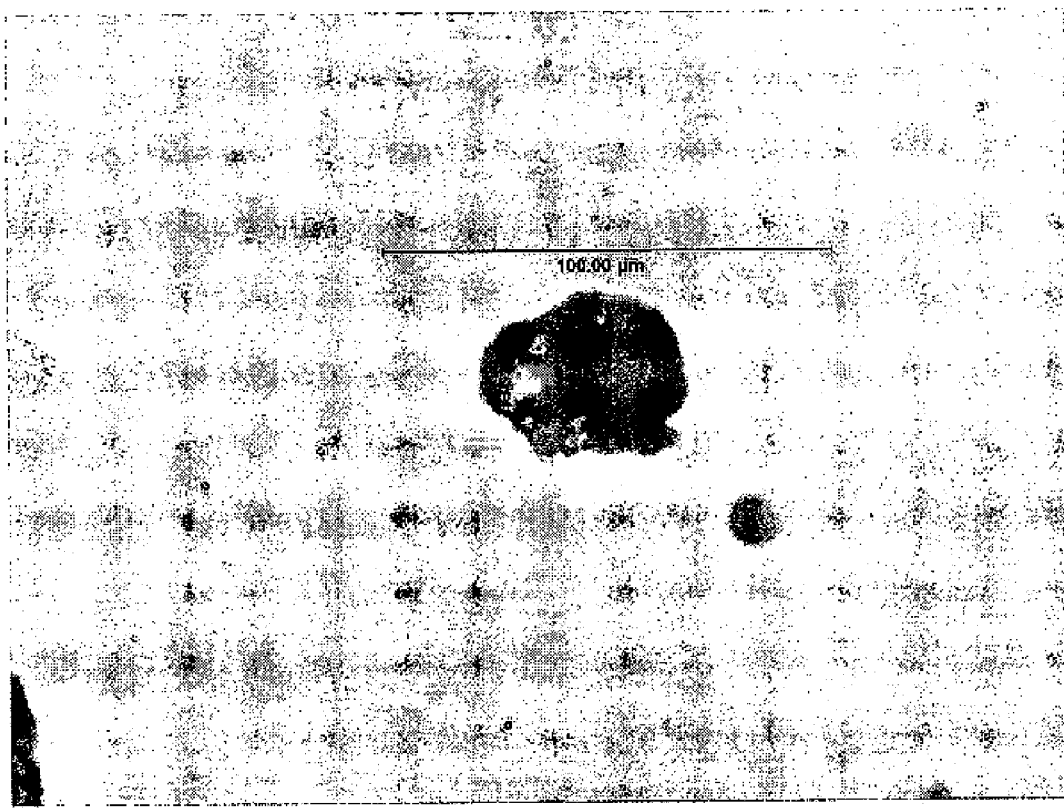
FIG. 1 is a photomicrograph of particles of processed paint booth overspray used in the present invention.

The compositions of the present invention are sealants for use in filling gaps between and in structural parts, such as small gaps at the interface of two structural parts or holes. The inventive compositions utilize processed paint booth overspray as one constituent. Processed paint booth overspray is prepared in the conventional manner by collecting paint overspray from a paint booth chamber. It will be appreciated that motor vehicle bodies receive a series of coatings during manufacture. When sprayed, these coatings are typically applied in controlled chambers in which a wet-scrubber system collects the coating overspray. One such application provides a primed surface on the vehicle body. It is believed, however, that the primers which are used may not be optimally suited for use in forming sealant compositions due to the residual reactivity and chemical make-up of the primer overspray. At a later stage of the coating process, however, a layer of paint is applied to the primed metal surface of the vehicle body. It is this paint overspray which, once processed, is used as a component of the sealants of the present invention.

It is to be understood that the composition of paint booth overspray is determined by the composition of the paints used in the paint spray process. Preferred paint booth overspray in the present invention contains from 1% to 100% by weight acrylic. More preferably, the paint booth overspray preferred for use in the present invention is principally comprised of acrylics. In the most preferred embodiment of the present invention, the processed paint booth overspray particles are preferably at least 50% by weight substantially fully-cured acrylic resins, i.e. substantially fully reacted acrylic polymers. That is, in the most preferred embodiment, the acrylics of the processed paint overspray lack any substantial content of unreacted functionalities. The processed paint booth overspray may include lesser amounts (preferably lesser amounts) of various other paint resins such as epoxies and the like and small amounts of cross-linking agents such as melamines. As with the acrylics, these additional resins are preferably substantially fully-cured, i.e., they should lack any substantial content of unreacted chemical functionalities. By assuring that the polymers of the processed paint booth overspray are substantially unreactive, unwanted reactions in the resin-based structural materials of the present invention are avoided.

Referring now to FIG. 1 of the drawings, the particles of substantially fully cured paint booth overspray particles used in the present invention are shown. The individual particles preferably have an average size of from about 50 and 200 microns (diameter) with particles ranging in size from about 10 microns to 400 microns (diameter). In terms of mesh size the preferred substantially fully-cured paint booth overspray used in the present invention is preferably about 120 mesh (U.S. mesh standard).

As stated above, the paint booth overspray is collected from the paint spray booth, typically by a wet-scrubber system. The paint overspray is then treated with a detackifying agent to detackify the particles. A flocculating agent is then applied to the solution which causes the paint particles to aggregate whereupon they are collected. The detackified, flocculated paint overspray is then further processed by drying, particlizing and sizing using conventional particle sizing techniques such as sizing meshes and the like. Any unreacted resin and polymer functionalities are preferably substantially fully reacted during this drying process through use of heat in the drying operation.

A preferred substantially fully cured paint over spray composition for use in the present invention is sold by Hayden International under the trade name "DRYPURE II." DRYPURE II is principally comprised of substantially fully-reacted acrylics, with a minor amount of substantially fully-cured epoxies and melamines.

In a preferred embodiment of the resin-based structural materials of the present materials, the substantially fully-cured processed paint booth overspray particles form about 5% to about 75% percent by weight, and more preferably from about 10% to about 50% and most preferably from about 20% to about 35% of the sealant composition.

In addition to the paint overspray particles, the preferred formulations of the present invention contain from about 5% to about 75% and more preferably from about 10% to about 60% resin by weight, from about 0% to about 70% and more preferably from about 5% to about 30% by weight filler, from about 0% to about 10% and more preferably from about 0% to about 10% and more preferably from about 1% to about 10% by weight blowing agent, from about 0% to about 10% and more preferably from about 1% to about 5% weight curing agent and from about 0% to about 10% and more preferably from about 0.5% to about 2% weight accelerator.

Preferably, the resin component of the inventive sealant compositions are a blend of resins, which may include one or more elastomers. Preferred thermoplastic resins useful in the present invention are polyolefins, preferably copolymers and terpolymers containing ethylene, for example, ethylene vinyl acetate copolymers, ethylene ethyl acrylate, ethylene-maleic anhydride copolymers, ethylene-vinyl acetate-glycidal methacrylate, ethylene acrylate-maleic anhydride, and ethylene-propylene copolymers. Fully acromatic hydrocarbon resins such as Norosolen S105 and Nevex 100 or Cumarone-indene resins such as Cumar R-012 may also be useful. Copolymers of ethylene with butene, hexene or octene are also preferred. Also, certain block copolymers such as an styrene-butadiene block copolymer may be suitable. Copolymers and terpolymers containing polyvinyl chloride are also preferred for use herein. Preferred thermosetting resins for use in the present invention are epoxies, acrylates, and polyurethanes and combinations thereof. EPDM is particularly preferred.

In one preferred embodiment, the resin component includes a polyolefin resin, preferably a combination of ethylene vinyl acetate copolymer (EVA) and one or more acrylic resins, such as ethylene methyl acrylate, ethylene ethyl acrylate and ethylene butyl acrylate. The preferred EVA has from about 9 to about 40 percent by weight vinyl acetate and the preferred ethylene methyl acrylate, ethylene ethyl acrylate and ethylene butyl acrylate have from about 20 to about 40% methyl acrylate, ethyl acrylate or butyl acrylate, respectively.

A cross-linking or curing agent is also preferably included in the sealant compositions to cross-link the polyolefin. Preferred cross-linking agents should provide a reasonable shelf life, but should also be fully activated at the temperatures encountered in the curing environment such as automotive paint ovens. Suitable curing agents useful in the present invention are peroxy compounds such as 1,1-bis(t-butylperoxy)-3,3,5-trimethylcyclohexane and n-butyl-4,4-bis(t-butylperoxyl) valerate and particularly preferred are Varox 130XL, Varox 230XL and Varox 231XL sold by R. T. Vanderbilt Company.

In the most preferred embodiment, the curing agent includes a multifunctional cross-linking monomer such as trimethylolpropane trimethacrylate, pentaerythritol pentaacrylate, or trimethylolpropane triacrylate to increase cross-linking density.

The use of an agent which produces expansion of the sealant compositions when it is heated, for example, in the automotive paint oven or the like, provides a more uniform and reliable seal of access holes and gaps. Expansion may not be needed in all applications but will be beneficial in many applications. Accordingly, in the preferred embodiment of the invention, the sealant compositions contain a blowing agent, preferably one which is thermally-activated, such as azodicarbonamide, para, para-oxybis (benzenesulfonyl-hydrazide) and para-toluene sulfonyl semicarbazide. Preferred are Celogen OT and Celogen AZ. Most preferred as a blowing agent is sodium acetate to produce a volumetric expansion of the sealant composition of from about 25% to about 1500% by volume of its unexpanded volume. The preferred blowing agent is fully activated at about 100 to about 165° C.

It will be appreciated that the processed paint booth overspray functions principally as a filler. If additional fillers are need or desired, the following materials are suitable for that purpose: calcium carbonate, talc, clay, mica, and calcium sulfate.

In a number of applications, a tackifier component may also be included in the present invention to provide adhesion and to enhance peel strength. A number of tackifiers suitable for use herein will be known by those skilled in the art. Preferred are partially aromatic hydrocarbons such as "Escorez 2393" and "Staytac 100." Most preferred is Super Nevtac 99 or Cumar R-13 (Coumarone-Indene resin) available from the Neville Chemical Company.

A number of additives or co-agents may also be included in the sealant compositions such as antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids such as oils and stabilizers and combinations thereof.

One preferred formulation of the inventive sealants is set forth below in Table I:

TABLE I

| Component | Preferred Range (% by weight) |
|---|---|
| Base Resin (copolymers and polymers | 10 to 50 |
| Cross-linking Agent | 1 to 3 |
| Tackifier Resin | 5 to 20 |
| Paint Booth Overspray | 10 to 40 |
| Other Fillers | 0 to 30 |
| Processing Aids | 5 to 20 |
| Co-agents | 1 to 10 |

The inventive compositions are formed by admixing the above components using standard mixers and the like. In other words, the ingredients are combined and mixed to form the composition which can then be molded, extruded and the like to the desired shape.

In the method of the invention the sealant compositions are prepared, then preferably formed to near-net shape, and placed in the desired location for filling a gap or hole. The composition is then heated to thermally activate the blowing agent, whereupon the sealant expands to conform to adjacent surfaces and adhering thereto.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

What is claimed is:

1. A sealant composition, in admixture comprising: a resin, paint booth overspray particles; a curing agent; and a blowing agent wherein said paint overspray particles contain substantially fully cured acrylics.

2. The sealant composition recited in claim 1, wherein said paint overspray particles also contain epoxies.

3. The sealant composition recited in claim 1, wherein said paint overspray particles contain substantially no unreacted cross-linking functionalities.

4. A sealant composition comprising:
   a resin, substantially fully cured paint booth overspray particles and a cross-linking agent.

* * * * *